(12) United States Patent
Yang et al.

(10) Patent No.: US 10,673,556 B2
(45) Date of Patent: Jun. 2, 2020

(54) METHOD FOR TRANSMITTING CONTROL INFORMATION, AND APPARATUS THEREFOR

(71) Applicant: LG ELECTRONICS INC., Seoul (KR)

(72) Inventors: Suckchel Yang, Seoul (KR); Daesung Hwang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 84 days.

(21) Appl. No.: 15/542,301

(22) PCT Filed: Jan. 11, 2016

(86) PCT No.: PCT/KR2016/000227
§ 371 (c)(1),
(2) Date: Jul. 7, 2017

(87) PCT Pub. No.: WO2016/111599
PCT Pub. Date: Jul. 14, 2016

(65) Prior Publication Data
US 2018/0270011 A1    Sep. 20, 2018

Related U.S. Application Data

(60) Provisional application No. 62/261,333, filed on Dec. 1, 2015, provisional application No. 62/257,271, filed
(Continued)

(51) Int. Cl.
*H04L 1/18* (2006.01)
*H04L 5/00* (2006.01)
(Continued)

(52) U.S. Cl.
CPC .......... *H04L 1/0007* (2013.01); *H04B 7/0626* (2013.01); *H04L 1/0026* (2013.01);
(Continued)

(58) Field of Classification Search
CPC ............. H04W 72/0413; H04L 1/0026; H04L 1/1671; H04L 1/18; H04L 1/1861; H04L 5/0055; H04L 5/0057
See application file for complete search history.

(56) References Cited

U.S. PATENT DOCUMENTS

2011/0103341 A1    5/2011  Ko et al.
2011/0299484 A1*  12/2011  Nam ..................... H04L 1/0025
                                              370/329
(Continued)

FOREIGN PATENT DOCUMENTS

CN    103368940 A    10/2013
CN    103563322 A     2/2014
(Continued)

OTHER PUBLICATIONS

Catt, "ULACK/NACK Transmission Design in TDD with CA," 3GPP TSG RAN WG1 Meeting #60, R1-100875, San Francisco, USA, Feb. 22-26, 2010, 7 pages.
(Continued)

*Primary Examiner* — Un C Cho
*Assistant Examiner* — Peter K Mak
(74) *Attorney, Agent, or Firm* — Dentons US LLP

(57) ABSTRACT

The present invention relates to a wireless communication system. More specifically, the present invention relates to a method for transmitting control information and an apparatus therefor, the method comprising the steps of: detecting one or more PDSCHs on a plurality of cells, wherein the plurality of cells are divided into a first cell set having PCell and a first SCell, and a second cell set having one or more
(Continued)

second SCells; and as feedback for the one or more PDSCHs, transmitting HARQ-ACK information over PUCCH, wherein when the one or more PDSCHs are detected only in the first cell set, the HARQ-ACK information contains only a HARQ-ACK response for the first cell set, and when the one or more PDSCHs are detected at least in the second cell set, the HARQ-ACK information contains HARQ-ACK responses for both the first and the second cell sets.

20 Claims, 13 Drawing Sheets

Related U.S. Application Data on Nov. 19, 2015, provisional application No. 62/250,499, filed on Nov. 3, 2015, provisional application No. 62/190,744, filed on Jul. 10, 2015, provisional application No. 62/128,990, filed on Mar. 5, 2015, provisional application No. 62/101,383, filed on Jan. 9, 2015.

(51) Int. Cl.
*H04L 27/26* (2006.01)
*H04W 72/04* (2009.01)
*H04L 1/00* (2006.01)
*H04L 1/16* (2006.01)
*H04B 7/06* (2006.01)

(52) U.S. Cl.
CPC .......... *H04L 1/0028* (2013.01); *H04L 1/0031* (2013.01); *H04L 1/1671* (2013.01); *H04L 1/18* (2013.01); *H04L 1/1812* (2013.01); *H04L 1/1861* (2013.01); *H04L 5/00* (2013.01); *H04L 5/0055* (2013.01); *H04L 27/26* (2013.01); *H04W 72/0413* (2013.01)

(56) References Cited

U.S. PATENT DOCUMENTS

| | | | |
|---|---|---|---|
| 2012/0099545 A1* | 4/2012 | Han | H04L 1/1678 370/329 |
| 2012/0307733 A1 | 12/2012 | Kim | |
| 2013/0022019 A1* | 1/2013 | Han | H04L 5/0053 370/329 |
| 2013/0176920 A1 | 7/2013 | Seo et al. | |
| 2013/0272189 A1* | 10/2013 | Lee | H04B 7/155 370/315 |
| 2013/0301433 A1 | 11/2013 | Yin et al. | |
| 2014/0003452 A1* | 1/2014 | Han | H04W 72/1268 370/474 |
| 2014/0029533 A1* | 1/2014 | Han | H04W 72/0413 370/329 |
| 2016/0174213 A1 | 6/2016 | Webb et al. | |

FOREIGN PATENT DOCUMENTS

| | | |
|---|---|---|
| CN | 103684705 A | 3/2014 |
| EP | 2592776 A1 | 5/2013 |
| EP | 2942896 A1 | 11/2015 |
| KR | 10-2012-0093912 A | 8/2012 |
| KR | 10-2013-0005625 A | 1/2013 |
| KR | 10-2013-0045226 A | 5/2013 |
| KR | 10-2013-0051480 A | 5/2013 |
| WO | 2012036533 A1 | 3/2012 |
| WO | 2013113142 A1 | 8/2013 |
| WO | WO 2014/052375 A1 | 4/2014 |
| WO | WO 2014/073800 A1 | 5/2014 |
| WO | 2014107052 A1 | 7/2014 |
| WO | WO 2014/107050 A1 | 7/2014 |

OTHER PUBLICATIONS

Intel Corporation, "Evaluation of PUCCH Proposals for CA with up to 32 CCs," 3GPP TSG-RAN WG1 #81, R1-153079, Fukuoka, Japan, May 25-29, 2015, pp. 1-7.

* cited by examiner

PUCCH format 1a and 1b structure (normal CP case)

PUCCH format 2, 2a and 2b structure (normal CP case)

FIG. 12
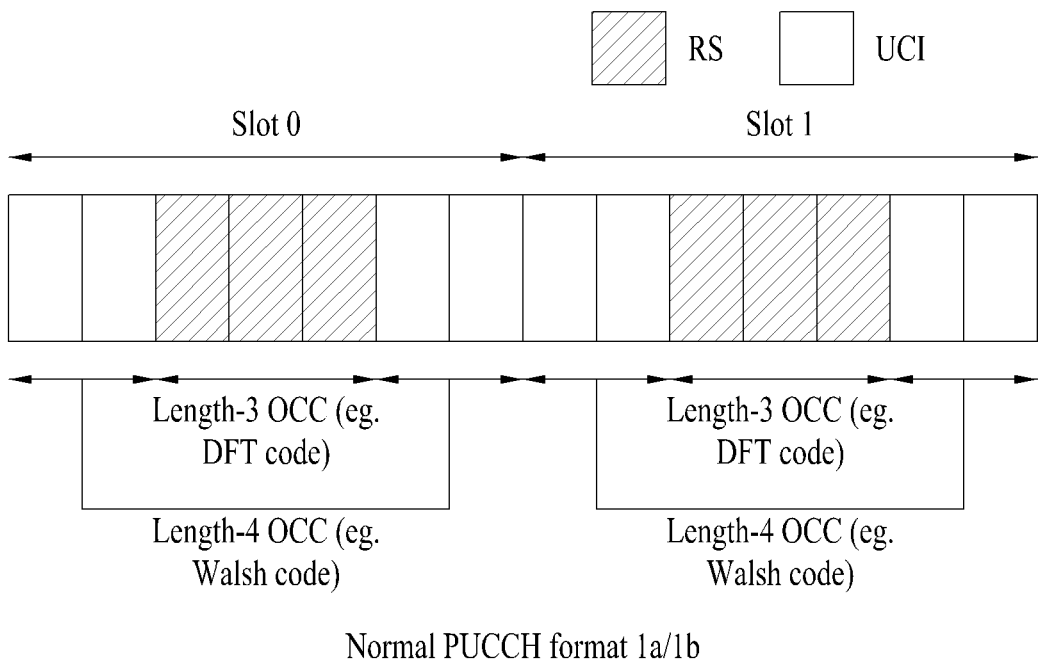
Normal PUCCH format 1a/1b
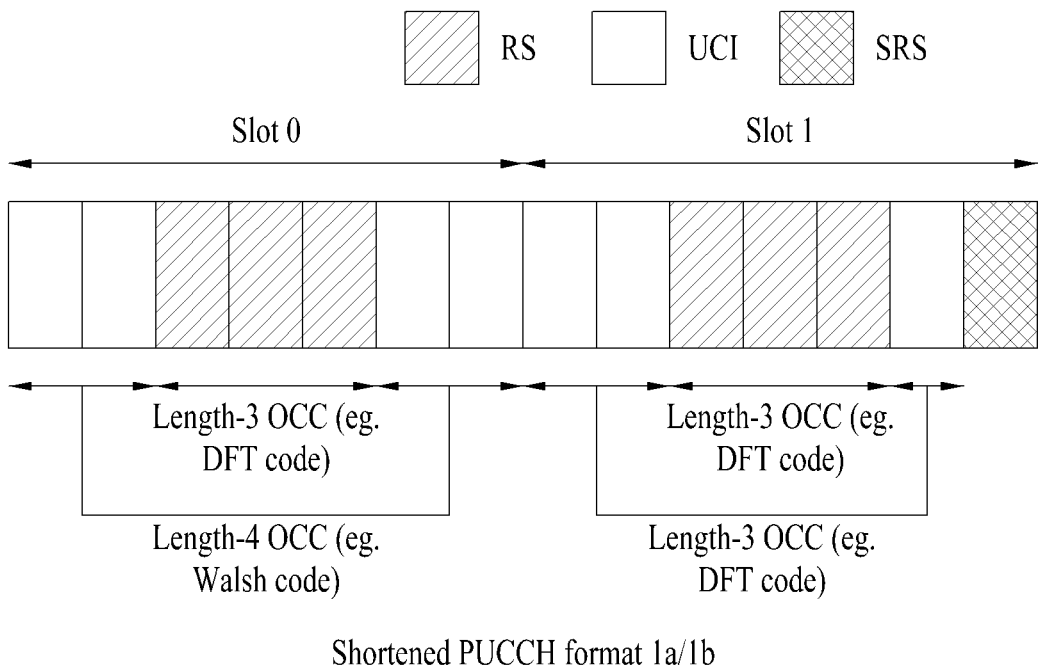
Shortened PUCCH format 1a/1b FIG. 13
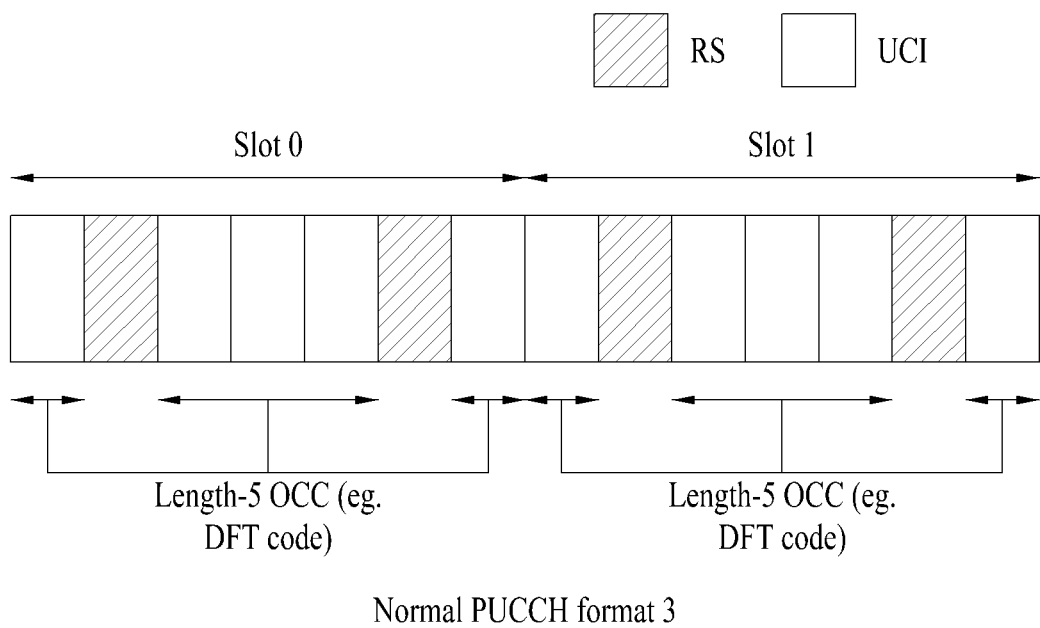
Normal PUCCH format 3
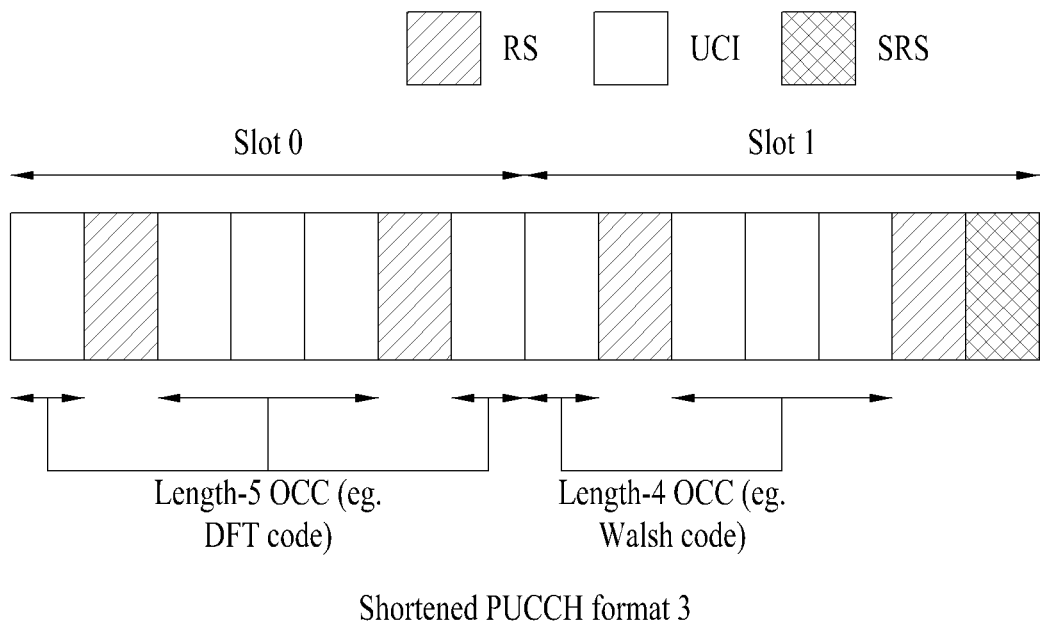
Shortened PUCCH format 3

UCI codeword size

* PF1: 1 or 2 bits.
* PF3: matches with resource amount of two SC-FDMA symbols (= 48 bits).
* PF4: matches with resource amount of all UCI SC-FDMA symbols.

* The maximum payload size of the PUCCH is varied depending on the number of UCI SC-FDMA symbols. For example, the number of UCI SC-FDMA symbols is N or N-1 (N>1).

METHOD FOR TRANSMITTING CONTROL INFORMATION, AND APPARATUS THEREFOR

CROSS REFERENCE TO RELATED APPLICATIONS

This application is the National Phase of PCT International Application No. PCT/KR2016/000227, filed on Jan. 11, 2016, which claims priority under 35 U.S.C. 119(e) to U.S. Provisional Application No. 62/101,383, filed on Jan. 9, 2015, 62/128,990, filed on Mar. 5, 2015, 62/190,744, filed on Jul. 10, 2015, 62/250,499, filed on Nov. 3, 2015, 62/257,271 filed on Nov. 19, 2015 and 62/261,333 filed on Dec. 1, 2015, all of which are hereby expressly incorporated by reference into the present application.

TECHNICAL FIELD

The present invention relates to a wireless communication system and, more specifically, to a method for transmitting control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DETAILED DESCRIPTION OF THE INVENTION

Technical Problems

An object of the present invention is to provide a method of efficiently transmitting control information in a wireless communication system and an apparatus therefor. Another object of the present invention is to provide a method of efficiently transmitting uplink control information and efficiently managing resources for the uplink control information in a carrier aggregation (CA) system and an apparatus therefor.

The technical problems solved by the present invention are not limited to the above technical problems and those skilled in the art may understand other technical problems from the following description.

Technical Solutions

According to an aspect of the present invention, provided herein is a method for a user equipment to transmit Hybrid ARQ Acknowledgement (HARQ-ACK) information, the method comprising: generating an Uplink Control Information (UCI) payload including the HARQ-ACK information within a maximum payload size of a Physical Uplink Control Channel (PUCCH); generating an UCI codeword from the UCI payload, wherein a size of the UCI codeword is matched to a total resource amount of UCI Single Carrier Frequency Division Multiple Access (SC-FDMA) symbols of the PUCCH; and transmitting the UCI codeword through the PUCCH in a subframe, wherein a number of the UCI SC-FDMA symbols is N or N−1 (N>1), and the maximum payload size of the PUCCH is varied depending on the number of the UCI SC-FDMA symbols.

In another aspect of the present invention, provided herein is A user equipment for use in a wireless communication, the user equipment comprising: a radio frequency (RF) unit; and a processor, wherein the processor is configured to generate an Uplink Control Information (UCI) payload including the HARQ-ACK information within a maximum payload size of a Physical Uplink Control Channel (PUCCH), generate an UCI codeword from the UCI payload, wherein a size of the UCI codeword is matched to a total resource amount of UCI Single Carrier Frequency Division Multiple Access (SC-FDMA) symbols of the PUCCH, and transmit the UCI codeword through the PUCCH in a subframe, wherein a number of the UCI SC-FDMA symbols is N or N−1 (N>1), and the maximum payload size of the PUCCH is varied depending on the number of the UCI SC-FDMA symbols.

The maximum payload size of the PUCCH when the number of the UCI SC-FDMA symbols is N−1 may be configured to be less than when the number of the UCI SC-FDMA symbols is N.

If an original size of the UCI payload is larger than the maximum payload size of the PUCCH, an operation for reducing a size of the HARQ-ACK information may be performed.

Different information may be transmitted in each UCI SC-FDMA symbol of the PUCCH.

The number of UCI SC-FDMA symbols may be N when a Sounding Reference Signal (SRS) protection is not required at the subframe, and the number of UCI SC-FDMA symbols may be N−1 when the SRS protection is required at the subframe.

The number of UCI SC-FDMA symbols may be N when a Sounding Reference Signal (SRS) transmission of the user equipment is not present at the subframe, and the number of UCI SC-FDMA symbols may be N−1 when the SRS transmission of the user equipment is present at the subframe.

N may be 12 when a normal CP is configured, and N may be 10 when an extended CP is configured.

Advantageous Effects

According to the present invention, control information can be efficiently transmitted in a wireless communication system. Specifically, uplink control information can be efficiently transmitted and resources for the uplink control information can be efficiently managed in a CA system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 12 illustrates normal and shortened formats of PUCCH format 1a/1b;

FIG. 13 illustrates normal and shortened formats of PUCCH format 3;

BEST MODE FOR CARRYING OUT THE INVENTION

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
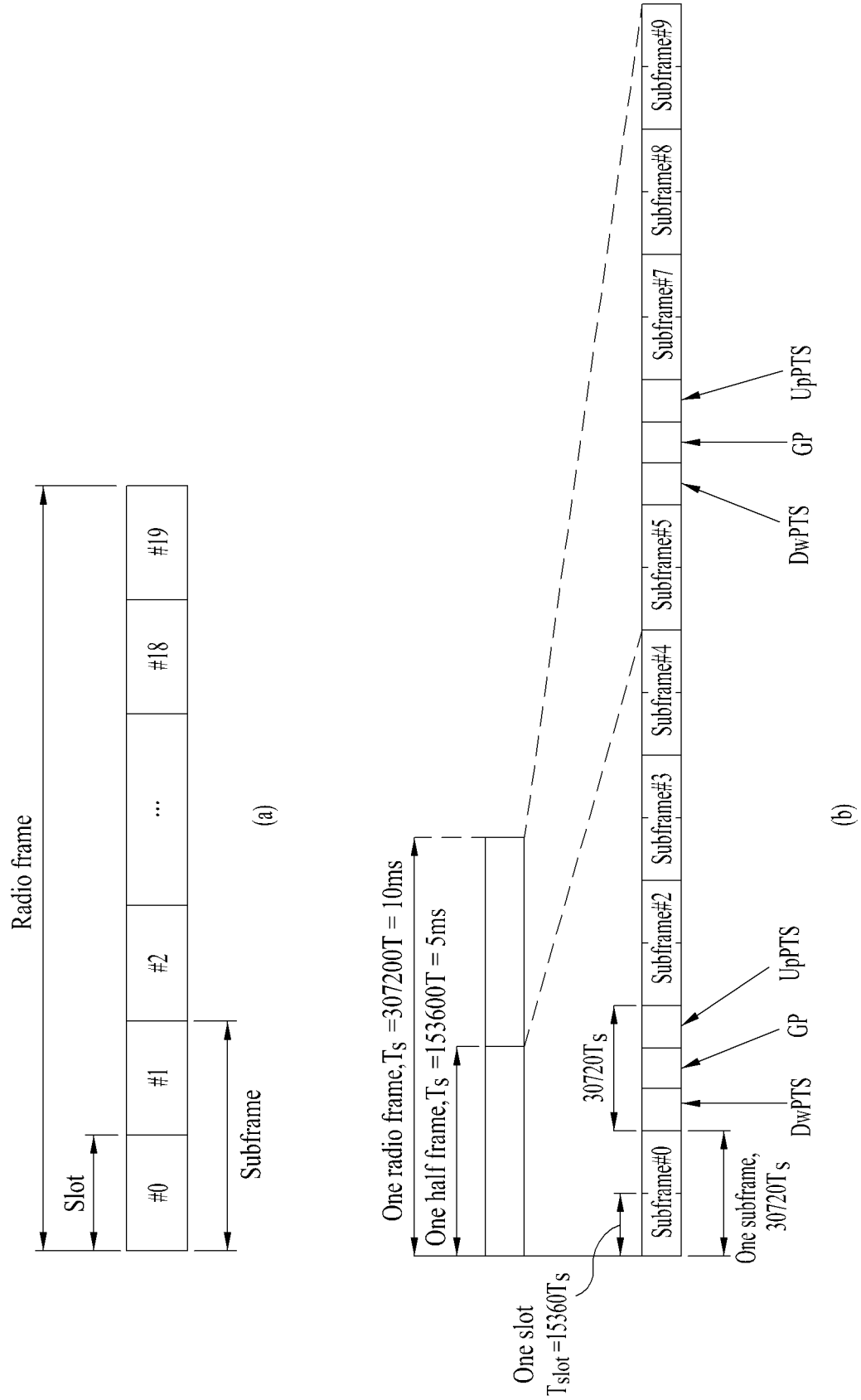
FIG. 1 illustrates a radio frame structure.

FIG. 1 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure applicable to FDD (Frequency Division Duplex) and a type-2 radio frame structure applicable to TDD (Time Division Duplex).

FIG. 1(a) illustrates the type-1 radio frame structure. A DL radio frame includes 10 subframes, each subframe including two slots in the time domain. A time required to transmit one subframe is defined as a transmission time interval (TTI). For example, one subframe may be 1 ms long and one slot may be 0.5 ms long. One slot includes a plurality of OFDM symbols in the time domain and a plurality of resource blocks (RBs) in the frequency domain. Since an LTE(-A) system uses OFDMA for DL, an OFDM symbol indicates one symbol period. The OFDM symbol may be called an SC-FDMA symbol or symbol period. An RB is a resource allocation unit including a plurality of contiguous subcarriers in one slot.

The number of OFDM symbols included in one slot may be changed according to configuration of a cyclic prefix (CP). For example, if each OFDM symbol is configured to include a normal CP, one slot may include 7 OFDM symbols. If each OFDM symbol is configured to include an extended CP, one slot may include 6 OFDM symbols.

FIG. 2(b) illustrates a type-2 radio frame structure. The type-2 radio frame includes 2 half frames. Each half frame includes 5 subframes each of which is composed of 2 slots.

Table 1 shows UL-DL configurations (UL-DL Cfgs) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes a DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows DwPTS/GP/UpPTS according to special subframe configuration. In Table 2, $T_s$ denotes sampling time.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The radio frame structure is merely exemplary and the number of subframes included in the radio frame, the number of slots included in a subframe, and the number of symbols included in a slot can vary.

Figure 2:
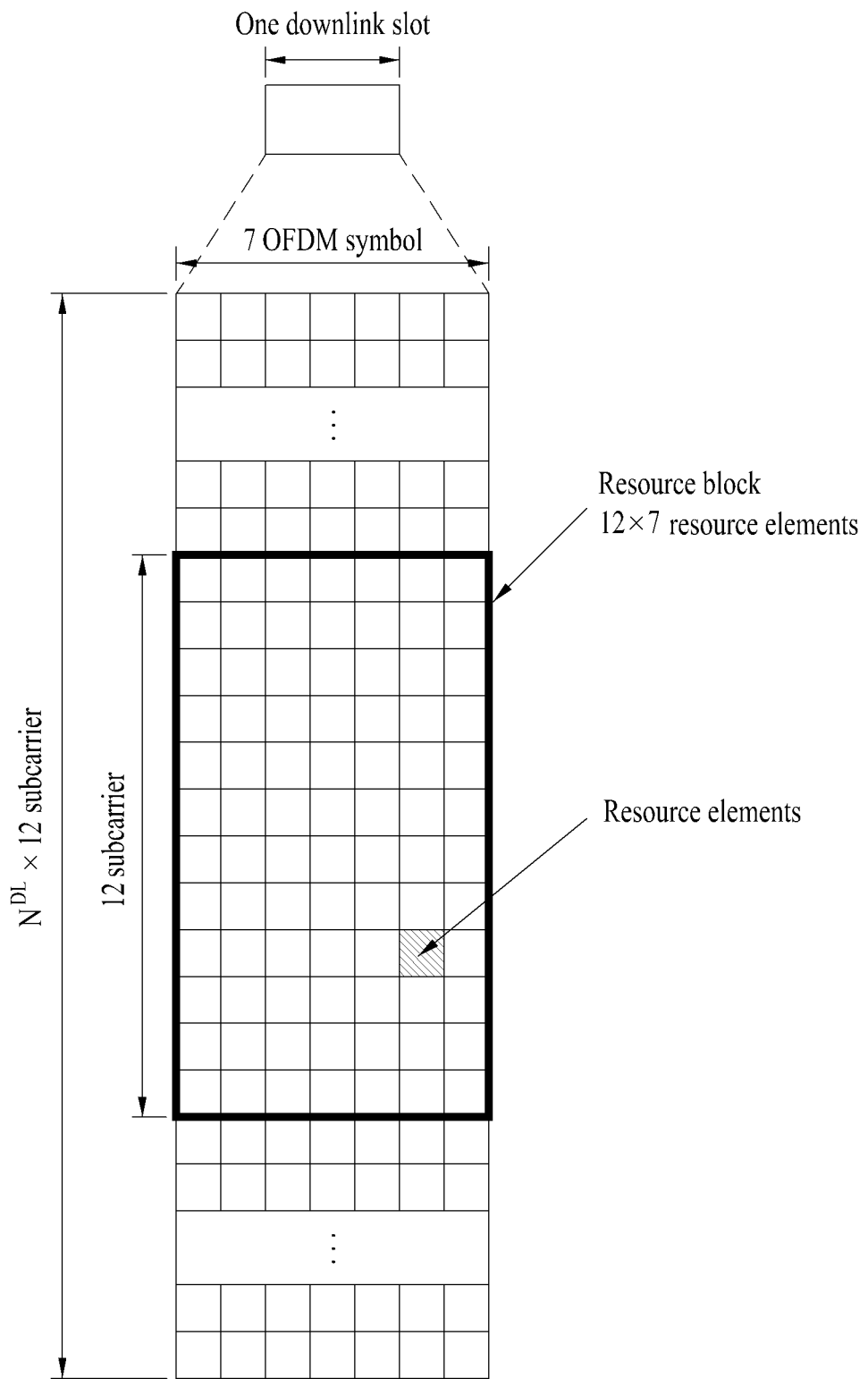
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7 (or 6) REs. The number $N_{RB}$ of RBs depends on a system bandwidth (BW). The structure of an uplink slot may be same as that of the downlink slot except that OFDM symbols by replaced by SC-FDMA symbols.

Figure 3:
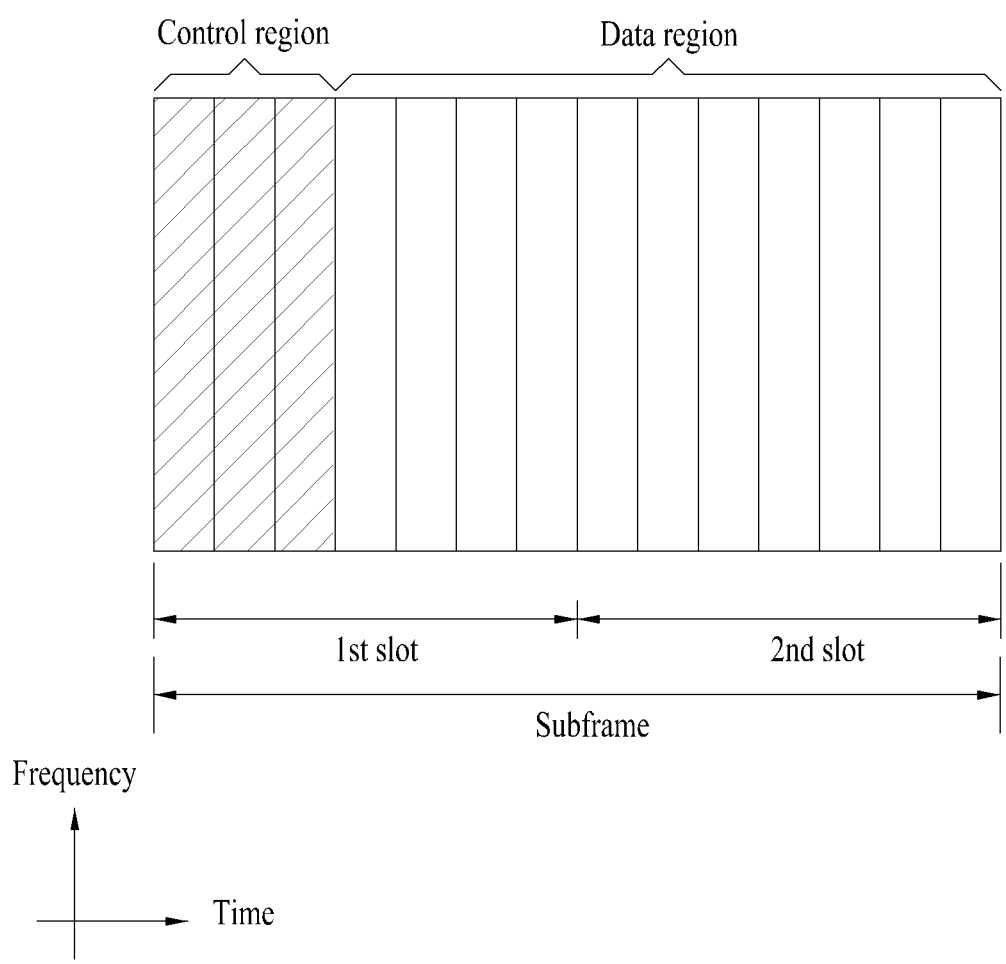
FIG. 3 illustrates a downlink subframe structure.

FIG. 3 illustrates a downlink subframe structure.

Referring to FIG. 3, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift for a DMRS (Demodulation Reference Signal), CQI (Channel Quality Information) request, HARQ process number, TPMI (Transmitted Precoding Matrix Indicator), PMI (Precoding Matrix Indicator) confirmation according as necessary.

The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. A UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. A BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, then an identifier (e.g., cell-RNTI (C-RNTI)) of the UE may be masked to the CRC. Alternatively, when the PDCCH is for a paging message, a paging identifier (e.g., paging-RNTI (P-RNTI)) may be masked to the CRC. When the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
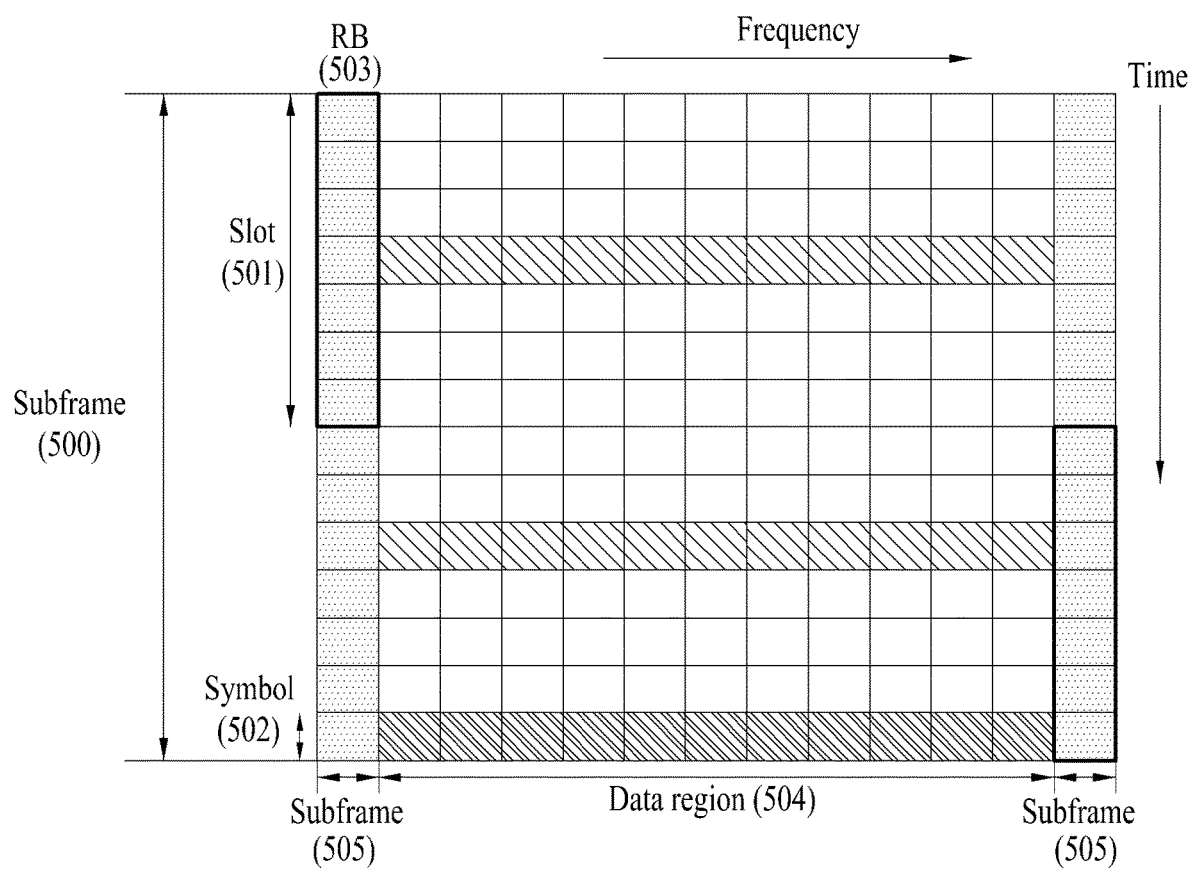
FIG. 4 illustrates an uplink subframe structure.

FIG. 4 illustrates an uplink subframe structure used in LTE.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ-ACK: This is a response to a downlink data packet (e.g. codeword) on a PDSCH and indicates whether the downlink data packet has been successfully received. A 1-bit A/N signal is transmitted as a response to a single downlink codeword and a 2-bit A/N signal is transmitted as a response to two downlink codewords.

Channel Quality Indicator (CQI): This is feedback information about a downlink channel. MIMO (Multiple Input Multiple Output)-related feedback information includes a rank indicator (RI), a precoding matrix indicator (PMI) and a precoding type indicator (PTI). 20 bits per subframe are used.

Table 3 shows the mapping relationship between PUCCH formats and UCI in LTE.

TABLE 3

| PUCCH format | UCI (Uplink Control Information) |
|---|---|
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

Figure 5:
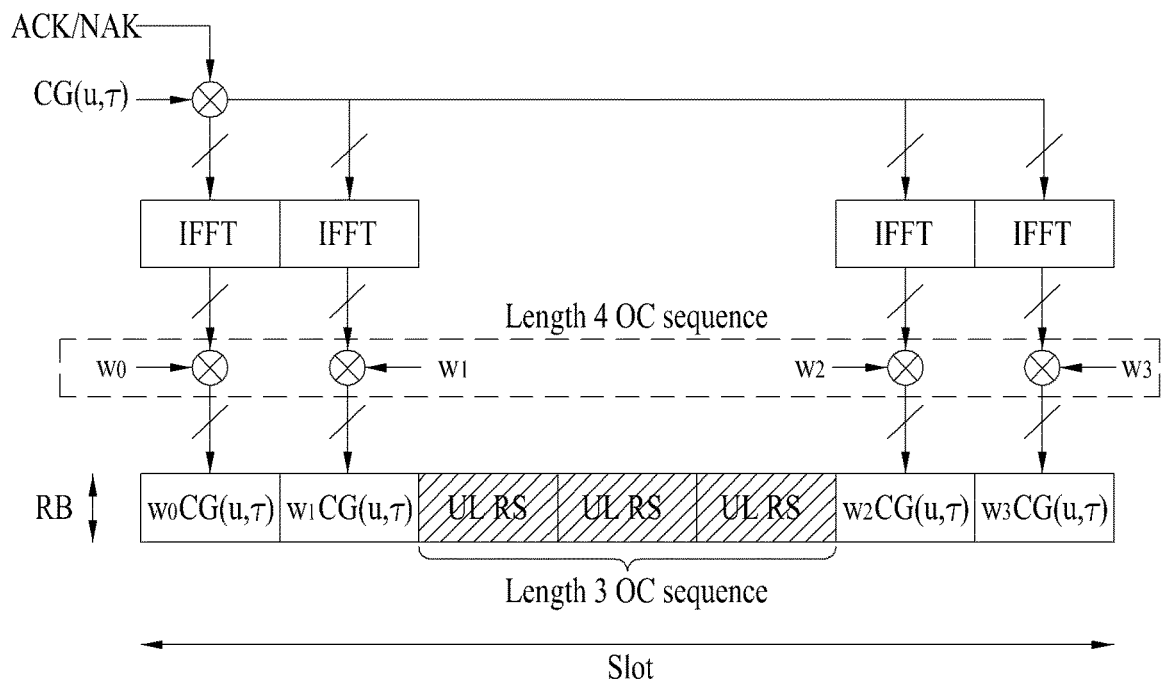
FIG. 5 illustrates a slot level structure of physical uplink control channel (PUCCH) format 1a/1b.

FIG. 5 illustrates a slot level structure of PUCCH format 1a/1b. PUCCH format 1a/1b is used for ACK/NACK transmission. In a normal CP, SC-FDMA #2/#3/#4 is used to transmit a DMRS. In an extended CP, SC-FDMA #2/#3 is used to transmit the DMRS. Therefore, 4 SC-FDMA symbols in a slot are used for ACK/NACK transmission. For convenience, PUCCH format 1a/1b is referred to as PUCCH format 1.

Referring to FIG. 5, 1-bit [b(0)] and 2-bit [b(0)b(1)] A/N information are modulated according to BPSK (binary phase shift keying) and QPSK (quadrature phase shift keying) modulation schemes respectively, to generate one ACK/NACK modulation symbol $d_0$. Each bit [b(i), i=0, 1] of the ACK/NACK information indicates a HARQ response to a corresponding DL transport block, corresponds to 1 in the case of positive ACK and corresponds to 0 in case of negative ACK (NACK). Table 4 shows a modulation table defined for PUCCH formats 1a and 1b in LTE.

TABLE 4

| PUCCH format | b(0), . . . , b($M_{bit}$ −1) | d(0) |
|---|---|---|
| 1a | 0 | 1 |
|  | 1 | −1 |
| 1b | 00 | 1 |
|  | 01 | −j |
|  | 10 | j |
|  | 11 | −1 |

In PUCCH format 1a/1b, cyclic shift (CS) ($\alpha_{cs,x}$) is performed in the frequency domain and spreading is performed using an orthogonal code (OC) (e.g. Walsh-Hadamard or DFT code) w0, w1, w2, w3 in the time domain. Since code multiplexing is used in both the frequency domain and the time domain, more UEs may be multiplexed in the same PUCCH RB.

Figure 6:
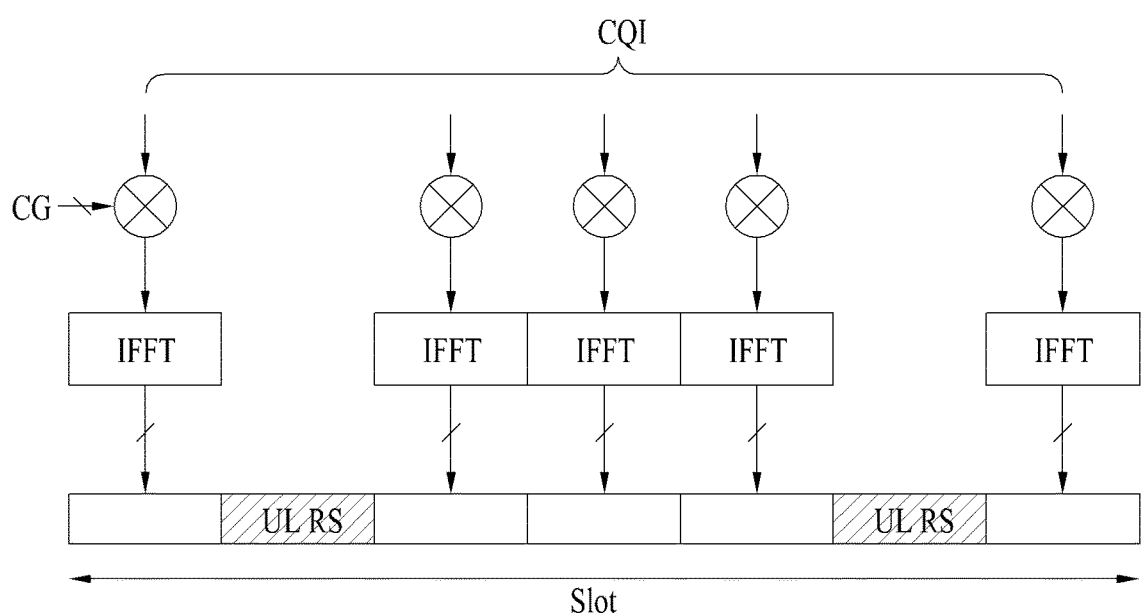
FIG. 6 illustrates a slot level structure of PUCCH format 2/2a/2b.

FIG. 6 illustrates PUCCH format 2/2a/2b. PUCCH format 2/2a/2b is used for CQI transmission. In a normal CP, one subframe includes 10 QPSK data symbols in addition to RS symbols. Each of the QPSK symbols is spread by a CS in the frequency domain and then mapped to a corresponding SC-FDMA symbol. CS hopping of an SC-FDMA symbol level may be applied for randomization of inter-cell interference. An RS may be multiplexed by CDM using a CS. For example, if the number of available CSs is 12 or 6, then 12 or 6 UEs may be multiplexed in the same PRB.

Figure 7:
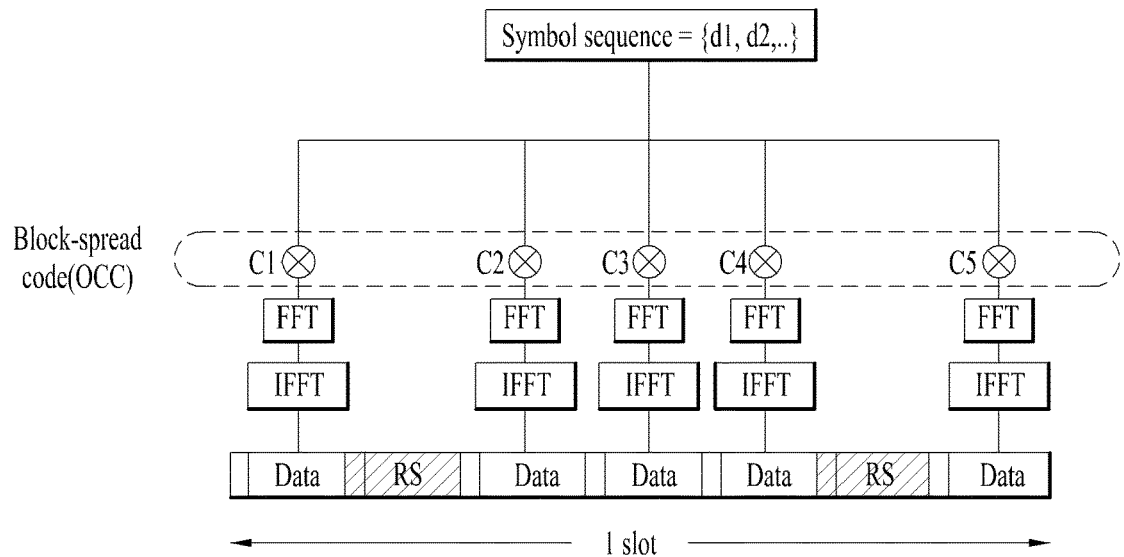
FIG. 7 illustrates a slot level structure of PUCCH format 3.

FIG. 7 illustrates the structure of PUCCH format 3 in a slot level. PUCCH format 3 is used to transmit a plurality of ACK/NACK information, and information such as CSI and/or SR may be transmitted together.

Referring to FIG. 7, one symbol sequence is transmitted over the frequency domain, and OCC-based time-domain spreading is applied to the symbol sequence. Control signals of a plurality of UEs may be multiplexed into the same RB using OCCs. Specifically, 5 SC-FDMA symbols (i.e. a UCI data part) are generated from one symbol sequence {d1, d2, . . . } using a length-5 OCC. Here, the symbol sequence {d1, d2, . . . } may be a modulation symbol sequence or a codeword bit sequence. The symbol sequence {d1, d2, . . . } may be generated by performing joint coding (e.g., Reed-Muller coding, tail-biting convolutional coding, etc.), block-spreading, and SC-FDMA modulation on a plurality of ACK/NACK information.

An ACK/NACK payload for PUCCH format 3 is configured per cell and then configured ACK/NACK payloads are concatenated according to cell index order. HARQ-ACK ACK feedback bits for a c-th serving cell (or DL CC) are given as $o_{c,0}^{ACK}$ $o_{c,1}^{ACK}$, . . . , $o_{c,O_c^{ACK}-1}^{ACK}$ (where c≥0). $O_c^{ACK}$ represents the number of bits (i.e., size) of a HARQ-ACK payload for the c-th serving cell. When a transmission mode supporting single transport block transmission is configured or spatial bundling is used for the c-th serving cell, $O_c^{ACK}$ may be set as, $O_c^{ACK}=B_c^{DL}$. If a HARQ-ACK response represents ACK, a HARQ-ACK feedback bit is set to 1 and, if the HARQ-ACK response represents NACK or discontinuous transmission (DTX), the HARQ-ACK feedback bit is set to 0.

If a transmission mode supporting transmission of multiple transport blocks (e.g., two transport blocks) is configured and spatial bundling is not used for the c-th serving cell, $O_c^{ACK}$ may be given as $O_c^{ACK}=2B_c^{DL}$. When HARQ-ACK feedback bits are transmitted through a PUCCH or when the HARQ-ACK feedback bits are transmitted through a PUSCH but W corresponding to the PUSCH is not present (e.g., an SPS based PUSCH), $B_c^{DL}$ is given as $B_c^{DL}=M$. M denotes the number of elements in set K defined in Table 3. If TDD UL-DL configurations are #1, #2, #3, #4, and #6 and HARQ-ACK feedback bits are transmitted through the PUSCH, $B_c^{DL}$ is given as $B_c^{DL}=W_{DAI}^{UL}$. Herein, $W_{DAI}^{UL}$ denotes a value indicated by a UL DAI field in a UL grant PDCCH (Table 7) and is simply shorten to W. If a TDD UL-DL configuration is #5, then $B_c^{DL}=W_{DAI}^{UL}+4\lceil(U-W_{DAI}^{UL})/4\rceil$. Herein, U denotes a maximum value of Uc, Uc representing the total number of PDSCH(s) received in subframe n−k and PDCCHs indicating (DL) SPS release in a c-th serving cell. Subframe n is a subframe in which the HARQ-ACK feedback bits are transmitted. $\lceil$ $\rceil$ denotes a ceiling function.

When a transmission mode supporting transmission of a single transport block is configured or spatial bundling is used for the c-th serving cell, the position of each ACK/NACK bit in the HARQ-ACK payload of the serving cell is given as $o_{c,DAI(k)-1}^{ACK}$. DAI(k) represents a DL DAI value detected from a DL subframe n−k. Meanwhile, when a transmission mode supporting transmission of multiple transport blocks (e.g., two transport blocks) is configured and spatial bundling is not used for the c-th serving cell, the positions of respective ACK/NACK bits in the HARQ-ACK payload of the serving cell are given as $o_{c,2DAI(k)-2}^{ACK}$ and $o_{c,2DAI(k)-1}^{ACK}$. Herein, $o_{c,2DAI(k)-2}^{ACK}$ represents HARQ-ACK for codeword 0 and $o_{c,2DAI(k)-1}^{ACK}$ represents HARQ- ACK for codeword 1. Codeword 0 and codeword 1 correspond to transport block 0 and transport block 1, respectively, or transport block 1 and transport block 0, respectively, according to swapping. When PUCCH format 3 is transmitted in a subframe configured for SR transmission, PUCCH format 3 is transmitted together with ACK/NACK bits and 1 SR bit.

Figure 8:
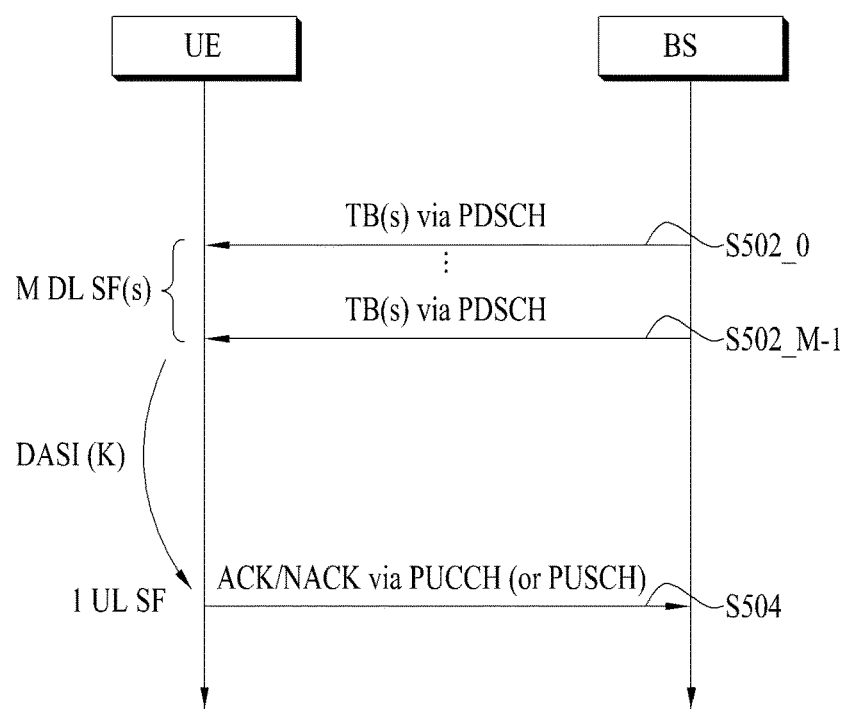
FIG. 8 illustrates a TDD A/N transmission procedure in single cell situation.

FIG. 8 illustrates a TDD UL A/N transmission procedure in single cell situation.

Referring to FIG. 8, a UE can receive one or more DL transmission signals (e.g. PDSCH signals) in M DL subframes (SFs) (S502_0 to S502_M−1). Each PDSCH signal is used to transmit one or more (e.g. 2) transport blocks (TBs) (or codewords) according to transmission mode. A PDCCH signal that requires an ACK/NACK response, for example, a PDCCH signal indicating SPS (Semi-Persistent Scheduling) release (simply, SPS release PDCCH signal) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via a procedure for transmitting ACK/NACK (e.g. ACK/NACK (payload) generation, ACK/NACK resource allocation, etc.) (S504). ACK/NACK includes acknowledgement information about the PDSCH signal and/or SPS release PDCCH received in step S502_0 to S502_M−1. While ACK/NACK is transmitted through a PUCCH basically, ACK/NACK may be transmitted through a PUSCH when the PUSCH is transmitted at an ACK/NACK transmission time. Various PUCCH formats shown in Table 3 can be used for ACK/NACK transmission. To reduce the number of transmitted ACK/NACK bits, various methods such as ACK/NACK bundling and ACK/NACK channel selection can be used.

As described above, in TDD, ACK/NACK for data received in the M DL subframes is transmitted through one UL subframe (i.e. M DL SF(s): 1 UL SF) and the relationship therebetween is determined by a downlink association set index (DASI).

Table 5 shows DASI (K: {k0, k1, . . . , k−1}) defined in LTE(-A). Table 5 shows intervals between a UL subframe transmitting ACK/NACK and a DL subframe associated with the UL subframe from the perspective of the UL subframe. Specifically, when a PDCCH that indicates PDSCH transmission and/or SPS release is present in subframe n−k (where k∈K), the UE transmits ACK/NACK in subframe n.

TABLE 5

| UL-DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Meanwhile, in FDD, ACK/NACK for data received in one DL subframe is transmitted through one UL subframe and k=4. That is, when a PDCCH that indicates PDSCH transmission and/or SPS release is present in subframe n−4, the UE transmits ACK/NACK in subframe n.

Figure 9:
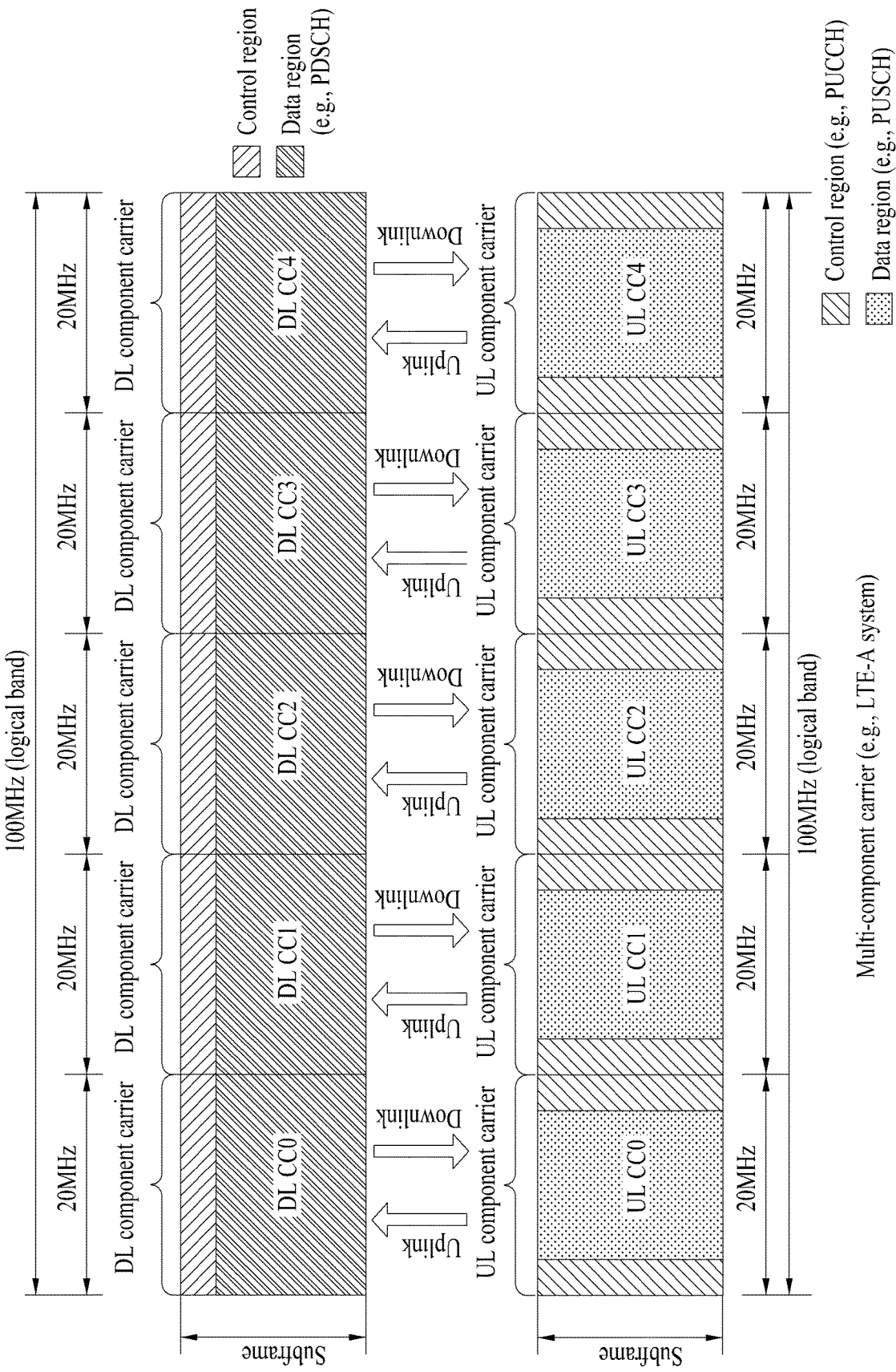
FIG. 9 illustrates a carrier aggregation (CA) communication system.

FIG. 9 illustrates a carrier aggregation (CA) communication system. LTE-A aggregates a plurality of UL/DL frequency blocks to support a wider UL/DL bandwidth in order to use a wider frequency band. Each frequency block is transmitted using a component carrier (CC). The CC may be regarded as a carrier frequency (or center carrier or a center frequency) for the corresponding frequency block.

Referring to FIG. 9, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC. This specific CC can be referred to as a primary CC (PCC) (or anchor CC) and other CCs can be referred to as secondary CCs (SCCs).

In LTE-A, the concept of a cell is used to manage radio resources [see, 36.300 V10.2.0 (2010-12) 5.5. Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information when carrier aggregation is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling)

semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 10:
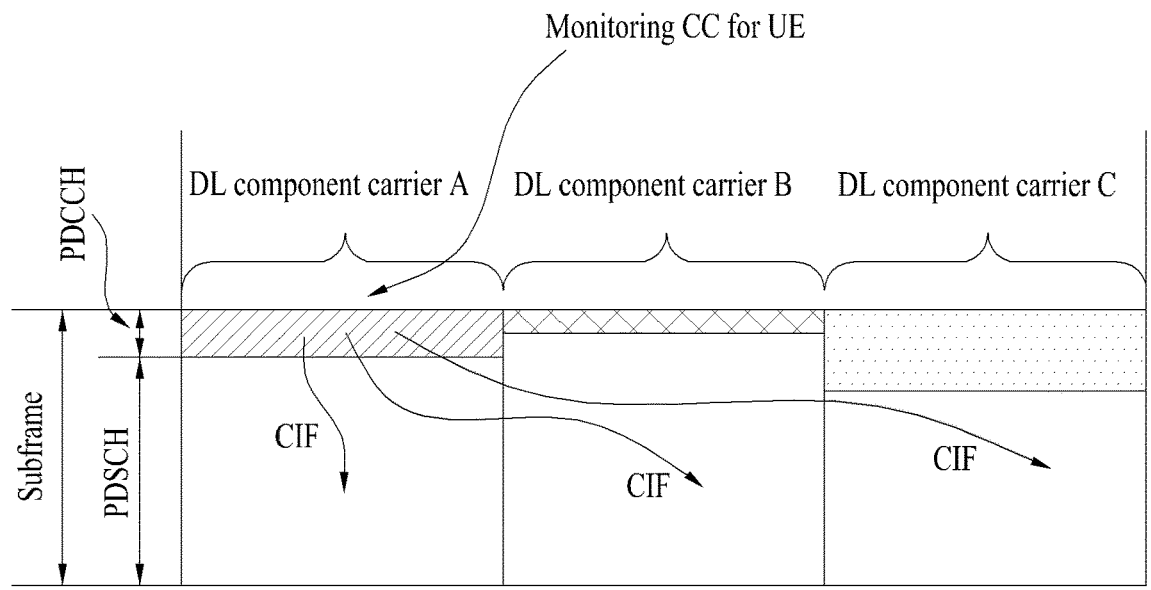
FIG. 10 illustrates scheduling when a plurality of carriers is aggregated.

FIG. 10 illustrates scheduling when a plurality of carriers is aggregated. It is assumed that 3 DL CCs are aggregated and DL CC A is set to a PDCCH monitoring DL CC in FIG. 11. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH rule. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, A PDCCH is not transmitted in DL CC B/C which is not set to a PDCCH monitoring DL CC.

UCI Transmission Method Considering UCI Coding Rate (or Code Rate)

Currently, a Rel-10/11/12 based LTE-A system may support CA up to 5 cells/carriers (hereinafter, referred to collectively as cells) with respect to one UE. In addition, a PUCCH has a structure configured to be transmitted only through a PCell. Meanwhile, in future systems, aggregation of 5 or more cells with respect to one UE is under consideration for the purpose of a higher data transmission rate. In this case, in consideration of increase in UCI size caused by increase in the number of cells, a new PUCCH format supporting a payload of a larger size than a legacy PUCCH format (e.g., PUCCH format 3) may be considered. In addition, in order to reduce increase in the number of UCI transmissions/UCI size and overhead of PUCCH resources in the PCell due to the increased UCI transmissions/UCI size, a method of enabling the PUCCH to be transmitted even through a specific SCell (hereinafter, ACell) may be considered.

In a legacy CA situation, a PUCCH format 3 (hereinafter, PF3) based method may be configured as a HARQ-ACK (hereinafter, A/N) feedback transmission method. PF3 may be applied to a CA situation supporting up to 5 cells. The PF3 based method configures A/N (bit) corresponding to each cell as one payload and maps/transmits a coded bit generated through a series of coding (e.g., Reed Muller (RM) coding) processes to a PF3 resource. A maximum input size of a UCI code that can be transmitted based on PF3 is 20 or 21 bits and an output size of the UCI code corresponding thereto is 48 bits. The PF3 resource may be allocated as one of a plurality of PF3 resources (previously) configured by a higher layer signal (e.g., RRC signaling) (regardless of whether cross-CC scheduling is configured). For example, a PF3 resource indicated by an A/N resource indicator (ARI) in a DL grant for scheduling an SCell, among a plurality of PF3 resources (previously) configured by a higher layer signal (e.g., RRC signaling), may be used for A/N transmission. The ARI may be included in a TPC field of a PDCCH corresponding to a PDSCH on the SCell. Different PF3 resources may be distinguished by at least one of an RB, an orthogonal cover code (OCC), and a cyclic shift (CS). Meanwhile, in the future systems, CA is configured by a larger number of cells and, for A/N feedback transmission corresponding to the cells, introduction of a new PUCCH format (hereinafter, PF4) occupying more UL control resources (e.g., a large number of RBs, an OCC of a short length, and a CS of a wide interval). Through PF4, a payload of a larger size can be supported.

Meanwhile, in PF4, a UCI code output size in the case of using a shortened PUCCH format (configured for SRS transmission and protection) may be different from that in the case of using a normal PUCCH format, according to structure such as the number of DMRS symbols and the length of the OCC. For example, a UCI code output size in the shortened format may be decreased relative to that in the normal format and thus, a UCI coding rate in the case of using the shortened format may be increased relative to that in the case of using the normal format. Similarly, a UCI code output size through extended CP based PF4 may be smaller than that through normal CP based PF4 and thus, a UCI coding rate through PF4 in an extended CP may be higher than that in a normal CP. In addition, when simultaneous transmission of A/N through a PUCCH and periodic CSI is configured, a UCI code input size in a CSI reporting subframe (in which the two UCIs can be transmitted) may be larger than that in a normal subframe (i.e., a subframe in which only A/N is transmitted because CSI reporting is not configured) and thus, a UCI coding rate in the CSI reporting subframe may be higher than that in normal subframe. Such variation in the UCI coding rate over the PUCCH according to variation in the UCI code input/output size may be generated or may be relatively increased particularly in a PF4 structure (i.e., PUSCH-similar structure) in which the OCC is not applied on the time/symbol axis (except for a DMRS) as opposed to legacy PF3.

The above example is described in more detail with reference to FIGS. 11 to 15.

Figure 11:
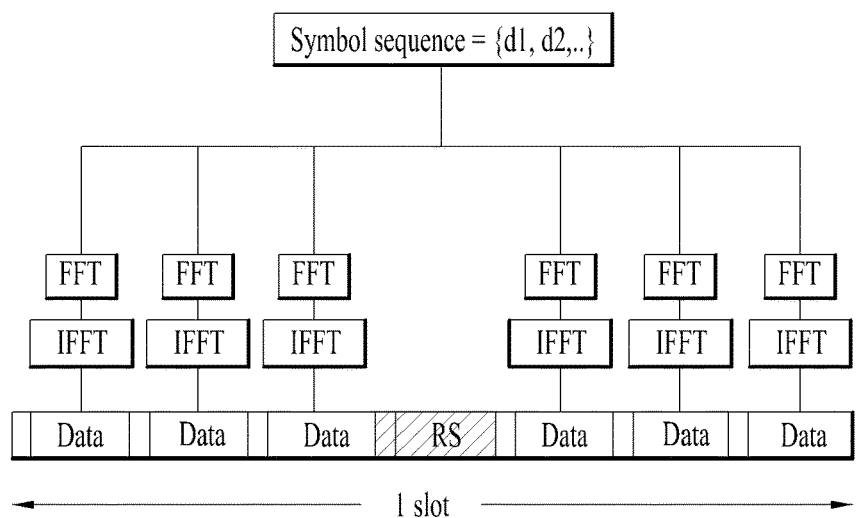
FIG. 11 illustrates a slot level structure of PF4.

FIG. 11 illustrates a slot level structure of PF4. In FIG. 11, PF4 has a PUSCH-similar structure (refer to the data region of FIG. 4). That is, only one RS SC-FDMA symbol is present per slot and the OCC is not applied to the time/symbol domain. Hence, different information is carried on each UCI SC-FDMA symbol (data block in the drawing). For example, a symbol sequence {d1, d2, . . . } may be sequentially carried from the first UCI SC-FDMA symbol to the last UCI SC-FDMA symbol of PF4. The symbol sequence {d1, d2, . . . } may be generated from a plurality of A/N through (joint) coding (e.g., Reed-Muller coding, tail-biting convolutional coding, etc.).

Tables 6 and 7 show cell-specific SRS transmission parameters and UE-specific SRS transmission parameters, respectively, for SRS transmission, defined in LTE.

TABLE 6

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

$T_{SFC}$ denotes cell-specific subframe configuration and $\Delta_{SFC}$ denotes a cell-specific subframe offset. srs-SubframeConfig is provided by higher layers. SRS is transmitted through a subframe satisfying $\lfloor n_s/2 \rfloor$ mod $T_{SFC} \in \Delta_{SFC}$, wherein $n_s$ denotes a slot index, $\lfloor \ \rfloor$ denotes a floor function, and mod denotes a modulo operation.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

An SRS configuration index $I_{SRS}$ is signaled on a per UE basis and each UE checks an SRS transmission periodicity $T_{SRS}$ and an SRS subframe offset $T_{offset}$ using the SRS configuration index $I_{SRS}$.

The cell-specific SRS transmission parameter indicates subframes occupied for SRS transmission in a cell to the UE and the UE-specific SRS transmission parameter indicates subframes that the UE is to actually use among the subframes occupied for SRS transmission. Next, the UE transmits an SRS through a specific symbol (e.g., last symbol) of a subframe designated by the UE-specific SRS transmission parameter (UE-specific SRS subframe). Meanwhile, in order to protect SRS transmission in subframes occupied through the cell-specific SRS transmission parameter (cell-specific SRS subframes), the UE may not transmit a UL signal on the last symbol of a subframe regardless of whether the SRS is actually transmitted in the corresponding subframe.

Figure 14:
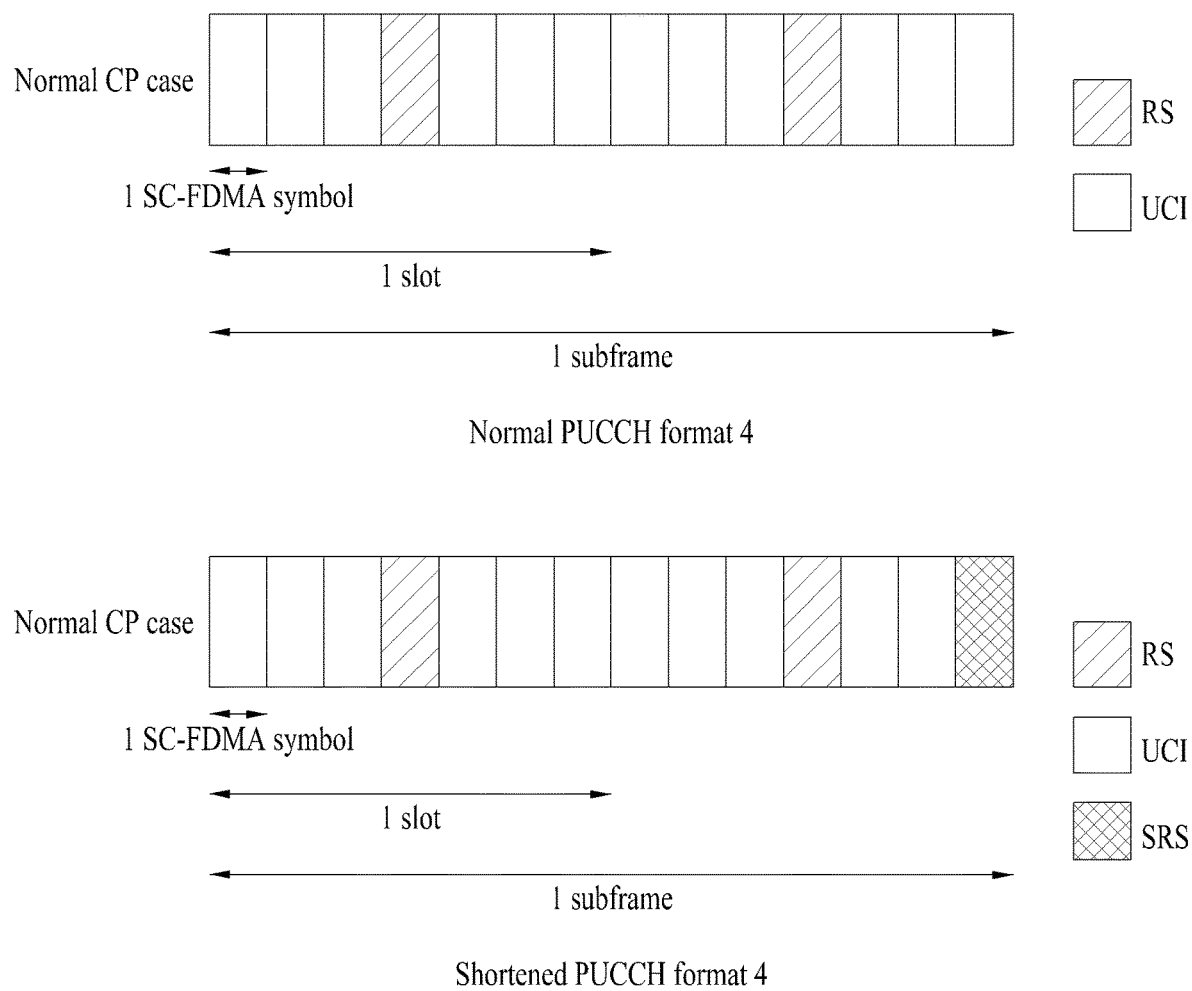
FIG. 14 illustrates normal and shortened formats of PUCCH format 4.

FIGS. 12 to 14 illustrate normal formats and shortened formats of a PUCCH. The shortened format is used when an SRS of a UE or an SRS of another UE should be protected. Specifically, the shortened format is used (i) when PUCCH transmission and SRS transmission of a UE collide in the same subframe (i.e., when a PUCCH is transmitted in a UE-specific SRS subframe) and (ii) when PUCCH transmission and SRS transmission of another UE collide in the same subframe (i.e., (a) when a PUCCH is transmitted in a cell-specific SRS subframe and a cell-specific SRS band and a PUCCH transmission band overlap or (b) the PUCCH is transmitted in the cell-specific SRS subframe). Otherwise, the normal format is used. The shortened format is not defined in PUCCH format 2/2a/2b. Collision of a CQI and an SRS is avoided by scheduling or is solved by SRS transmission dropping.

Referring to FIGS. 12 to 14, in the shortened format of the PUCCH, the last SC-FDMA symbol of a subframe is excluded from PUCCH transmission. Therefore, the number of UCI SC-FDMA symbols of the shortened format is less than that of the normal format by one. Since an OCC is applied to PF1 and PF3 in the time domain on a slot basis, use of the shortened format decreases the number of UCI SC-FDMA symbols in the second slot and, thus, the length of the OCC is also decreased (FIGS. 12 and 13). Meanwhile, since the OCC is not applied to PF4 in the time domain, use of the shortened format decreases only one UCI SC-FDMA symbol in the second slot (FIG. 14).

Figure 15:
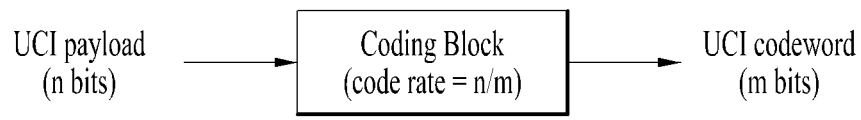
FIG. 15 illustrates UCI coding.

FIG. 15 illustrates UCI coding. A UCI payload (i.e., UCI code input) is converted into a UCI codeword (i.e., UCI code output) through a coding block. Coding may be performed using various legacy methods (e.g., Reed-Muller coding, tail-biting convolutional coding, etc.). A coding rate is defined as (UCI payload size/UCI codeword size). If the UCI payload size is n bits and the UCI codeword size is m bits, the coding rate is n/m. The UCI codeword corresponds to the symbol sequence of FIG. 11.

In PF1, the same information is repeated on a slot basis and information of one UCI SC-FDMA symbol in a slot is spread to a plurality of UCI SC-FDMA symbols through the OCC. That is, the information of one UCI SC-FDMA symbol is repeated on all UCI SC-FDMA symbols. Therefore, the UCI codeword size is determined based on a resource of one SC-FDMA symbol. Even when the number of UCI SC-FDMA symbols varies, the UCI codeword size is constant. Specifically, in the normal/shortened format, the UCI codeword size is identically maintained as one bit (BPSK) or two bits (QPSK). Similarly, even in PF3, the OCC is applied to a plurality of SC-FDMA symbols in a slot. PF3 has a form in which the information of one UCI SC-FDMA symbol per slot is repeated on all UCI SC-FDMA symbols. Accordingly, even when the number of UCI SC-FDMA symbols varies, the UCI codeword size is constant. That is, in the normal/shortened format, the UCI codeword size is identically maintained as 48 bits (QPSK).

On the other hand, in PF4, since the OCC is not applied in the time domain, the UCI codeword size is determined to match the amount of resources of all UCI SC-FDMA symbols. For example, the UCI codeword size of PF4 may be given as (number of REs of all UCI SC-FDMA symbols*modulation order). Accordingly, the UCI codeword size varies according to the number of UCI SC-FDMA symbols and, thus, the UCI coding rate varies. Then, the coding rate of the shortened format may be higher than that of the normal format.

In this way, the UCI coding rate in PF4 may differ according to subframe and, if the UCI coding rate increases too much, reliability of UCI transmission may deteriorate. Since PF4 has a structure similar to a PUSCH, the coding rate of a transport block may also differ according to subframe even in the PUSCH. However, since a HARQ process is applied to PUSCH transmission, even if transmission fails due to increase in coding rate, restoration of transmission is possible through retransmission. However, the HARQ process is not applied to UCI, failure of UCI transmission may have a significant effect on a system. In particular, since A/N is information which is dynamically transmitted only once, restoration is not possible upon transmission failure.

To solve this problem, a method for guaranteeing/maintaining UCI transmission performance is needed even in a situation in which the UCI coding rate increases. Hereinbelow, there is provided an adaptive UCI transmission method considering variation in UCI coding rate as a UCI code input/output size per subframe is changed in a CA situation. Specifically, the following four methods are provided in consideration of UCI transmission performance in a situation (e.g., a specific subframe) in which the UCI coding rate relatively increases. Meanwhile, in the present invention, A/N may be replaced with/extended to specific UCI (e.g., A/N (and/or SR) feedback itself or periodic CSI feedback) or a combination of a plurality of different UCIs (e.g., a combination of A/N (and/or SR) and periodic CSI). In addition, in the present invention, A/N includes an SR.

Hereinafter, a specific subframe includes a subframe in which a shortened PUCCH format is configured and/or a subframe in which periodic CSI reporting is configured (based on a specific cell (e.g., PCell)). For convenience, a subframe other than the specific subframe is referred to as a normal subframe. The subframe in which the shortened PUCCH format is configured includes (i) a UE-specific SRS subframe, (ii) a subframe in which a cell-specific SRS transmission band overlaps with a PUCCH transmission band among cell-specific SRS subframes, or (iii) a cell-specific SRS subframe.

Method 1-0) Indication of UCI Simultaneous Transmission

This method is to directly indicate, through (DL grant) DCI, whether to permit simultaneous transmission of plural UCIs (through a PUCCH) or not (e.g., ON/OFF), at a timing when transmission of the plural UCIs (e.g., periodic CSI (i.e., p-CSI) or an SRS) including A/N is simultaneously demanded. Specifically, when the plural UCIs consist of A/N and p-CSI, if simultaneous transmission OFF is indicated through the DCI, only A/N may be transmitted (through a PUCCH) with omission (dropping) of p-CSI transmission. Conversely, if simultaneous transmission ON is indicated through the DCI, simultaneous transmission of A/N and p-CSI (through the PUCCH) may be performed. In addition, when the plural UCIs consist of A/N and an SRS, if simultaneous transmission OFF is indicated through the DCI, only A/N may be transmitted using a normal PUCCH format with omitting (dropping) SRS transmission. Conversely, if simultaneous transmission ON is indicated through the DCI, simultaneous transmission of A/N and the SRS may be performed using a shortened PUCCH format. As another method, regardless of whether the SRS is included in UCI configuration, if simultaneous transmission OFF is indicated through the DCI, A/N may be transmitted using the normal PUCCH format and, if simultaneous transmission ON is indicated through the DCI, A/N may be transmitted using the shortened PUCCH format. Herein, A/N corresponding to the case in which simultaneous transmission ON is indicated through the DCI may be configured by shortened A/N by applying Method 1-1.

Meanwhile, when simultaneous transmission ON/OFF is indicated through the DCI, simultaneous transmission ON/OFF may be configured to be linked with an ARI value indicating an A/N transmission resource without an additional independent field/signaling.

The ARI may be included in a TPC field of a PDCCH corresponding to a PDSCH on an SCell. For example, if a specific ARI value (set) is indicated with respect to a p-CSI reporting subframe or an SRS transmission subframe, the same operation as the case of simultaneous transmission ON of (A/N+p-CSI) or (A/N+SRS) may be performed and, if the other ARI values (sets) are indicated, the same operation as the case of simultaneous transmission OFF may be performed. As another method, if an A/N payload size (e.g., the number of A/N bits) or an A/N coding rate over a (shortened format) PUCCH exceeds a specific level, the operation corresponding to simultaneous transmission OFF may be applied and, otherwise, the operation corresponding to simultaneous transmission ON may be applied.

Method 1-1) Reduction of A/N Size

This method entails configure an A/N size (e.g., the number of A/N bits) transmitted in a specific subframe to be smaller than that in a normal subframe. That is, the A/N size may be configured to differ according to subframe.

An example of using A/N to be transmitted in a specific subframe is as follows.

1) A/N may be configured only for some of all cells included in CA and the other cells may be regarded as not having been scheduled. On the other hand, in a normal subframe, A/N may be configured for all cells. Alternatively, 2) the A/N size may be reduced based on a scheme of compressing A/N for each cell (or each cell group) to one bit (or two bits) through bundling by logical AND operation (hereinafter, A/N size reduction). On the other hand, in the normal subframe, compression of the A/N size may be performed to be less than in the specific subframe or an A/N size compression process may be omitted.

Meanwhile, a maximum UCI payload size supportable for shortened PF4 may be reduced so as to be less than that for normal PF4. For example, when the maximum UCI payload size for shortened PF4 is configured independently of the maximum UCI payload size for normal PF4, the maximum UCI payload size for shortened PF4 may be configured to be smaller than the maximum UCI payload size for normal PF4. As such, in shortened PF4, A/N feedback of fewer bits may be transmitted or p-CSI feedback of fewer bits may be transmitted, through A/N compression, as compared with normal PF4.

In addition, in the case of transmission of different UCIs (e.g., UCI including A/N and UCI including only p-CSI) even for the same PF4, a maximum supportable UCI payload size may differ. Herein, for the same PF4, the maximum UCI payload size may be independently configured with respect to each UCI combination. For example, the maximum UCI payload size of UCI including A/N may be configured to be less than the maximum UCI payload size of UCI including only p-CSI).

Meanwhile, a maximum A/N payload size supportable through extended CP based PF4 (hereinafter, PF4_eCP) may be less than that supportable through normal CP based PF4 (hereinafter, PF4_nCP). Therefore, the maximum number of cells configurable in CA when PF4_eCP is configured may be less than that when PF4_nCP is configured. In addition, the maximum number of cells configurable in CA may be identical regardless of CP length, while A/N compression such as bundling may be applied only when PF4_eCP is configured (compared with the case of PF4_nCP with respect to the same number of cells or the same number of A/N bits).

Figure 16:
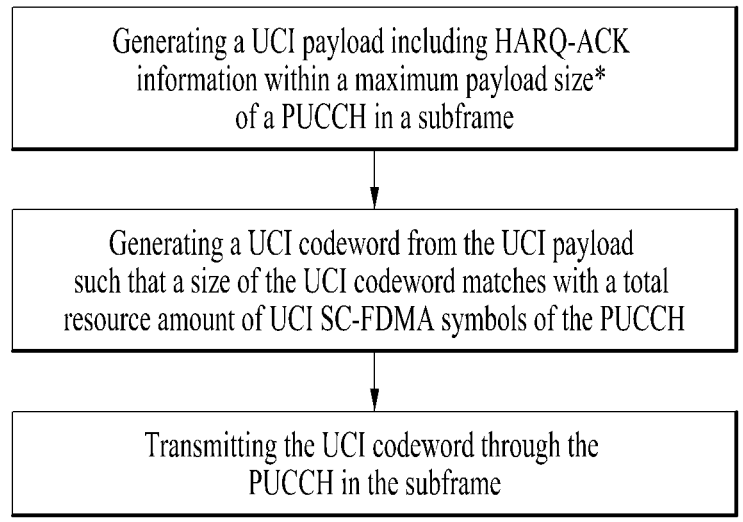
FIG. 16 illustrates a UCI transmission method according to an embodiment of the present invention.

FIG. 16 illustrates a UCI transmission method according to an embodiment of the present invention. It is assumed that PF4 is configured for A/N transmission in a CA situation. It is also assumed that an OCC is not applied to PF4 in the time domain (refer to FIG. 11).

Referring to FIG. 16, when A/N transmission is demanded in a subframe, a UE may generate a UCI payload including A/N information within a maximum payload size of a PUCCH (i.e. PF4) in the subframe (S1602). Herein, the A/N information includes A/N information (e.g., ACK, NACK, or DTX) about a PDSCH and/or an SPS release PDCCH received through a plurality of cells. Next, the UE generates a UCI codeword from the UCI payload, wherein the size of the UCI codeword matches the total amount of resources of UCI SC-FDMA symbols of the PUCCH (S1604). For example, the total amount of resources of UCI SC-FDMA symbols in PF4 may be given as (frequency band (e.g., in units of subcarriers) assigned to PF4)*(number of UCI SC-FDMA symbols). Herein, the frequency band may be given as (number of PRBs assigned to PF4)*(number of REs (e.g., 12) per PRB). Thereafter, the UE may transmit the UCI codeword through the PUCCH (S1606). The UCI codeword may be transmitted through processes of scrambling, modulation, resource mapping, etc. Herein, the maximum payload size of the PUCCH is varied depending on the number of UCI SC-FDMA symbols.

In the same CP, the number of UCI SC-FDMA symbols of PF4 may be N or N−1 (where N>1). For example, the number of UCI SC-FDMA symbols of PF4 may be given as.

Normal CP: {12 UCI SC-FDMA symbols in a normal PF4 format, 11 UCI SC-FDMA symbols in a shortened PF4 format}

Extended CP: {10 UCI SC-FDMA symbols in a normal PF4 format, 9 UCI SC-FDMA symbols in a shortened PF4 format}

That is, the number of UCI SC-FDMA symbols of PF4 may be 9 to 12 according to (i) CP configuration and (ii) subframe in which the PUCCH is transmitted.

Specifically, when the number of UCI SC-FDMA symbols is N−1, the maximum payload size of the PUCCH may be set to be smaller than the case in which the number of UCI SC-FDMA symbols is N. Herein, if SRS protection in a corresponding subframe is not demanded, the number of UCI SC-FDMA symbols may be N and, if SRS protection in a corresponding subframe is demanded, the number of UCI SC-FDMA symbols may be N−1. In addition, if there is no SRS transmission of the UE in a corresponding subframe, the number of UCI SC-FDMA symbols may be N and, if there is SRS transmission of the UE in a corresponding subframe, the number of UCI SC-FDMA symbols may be N−1.

In addition, when an original size of the UCI payload is greater than the maximum payload size of the PUCCH, an operation (e.g., bundling) for reducing the size of A/N information may be performed. Different information may be transmitted on respective UCI SC-FDMA symbols in the PUCCH.

Method 1-2) Increase of PUCCH Power

This method entails configuring the power of a PUCCH (carrying A/N) transmitted in a specific subframe to be increased more than that in a normal subframe. For example, an additional power offset to be applied to the A/N PUCCH may be differently configured according to subframe. A specific power offset P_off value (e.g., having a positive value) in addition to a legacy power control parameter may be additionally applied to a PUCCH to be transmitted in the specific subframe. On the other hand, an offset other than P_off (e.g., a value less than P_off) may be applied or no offset may be added to a PUCCH to be transmitted in the normal subframe.

Meanwhile, a power offset (for open-loop power control) configured for PF4_eCP may be different from a power offset configured for PF4 nCP. That is, different power offset values may be assigned to respective PUCCH formats by regarding PF4 having a different CP length as a different PUCCH format. In addition, a power offset (for open-loop power control) configured for shortened PF4 may be different from a power offset configured for normal PF4. That is, different power offset values may be assigned to respective PUCCH formats by regarding PF4 having a different format length as a different PUCCH format.

Method 1-3) Change of PUCCH Format

This method entails configuring the (maximum) payload size of a PUCCH format (carrying A/N) transmitted in a specific subframe to be extended more than that in a normal subframe. In other words, an A/N PUCCH format having a different payload size per subframe is configured. Herein, different PUCCH formats may be divided according to the number of RBs, an OCC length, and a DMRS structure which constitute a PUCCH resource. As an example, when a PUCCH format having a relatively small payload is referred to as an S-PF and a PUCCH format having a relatively large payload is referred to as an L-PF, the L-PF may be allocated as an A/N transmission resource in the specific subframe and the S-PF may be allocated as an A/N transmission resource in the normal subframe. The L-PF resource and the S-PF resource may be configured on the same cell (e.g., a PCell)) or different cells (e.g., the PCell and a specific SCell).

Specifically, a scheme may be considered in which a PUCCH format indicated by an ARI is differently configured according to subframe, a PUCCH transmission cell indicated by the ARI is differently configured according to subframe, or each ARI indicates a PUCCH resource on a different cell. As an example, the ARI may be configured to indicate one of a plurality of L-PF resources for a specific subframe and indicate one of a plurality of S-PF resources for a normal subframe. Alternatively, the ARI may be configured to indicate one of a plurality of PF4 resources on cell #1 for the specific subframe and indicate one of a plurality of PF4 resources on cell #2 for the normal subframe. Alternatively, the ARI may be configured to indicate one of a plurality of L-PF resources on cell #1 for the specific subframe and indicate one of a plurality of S-PF resources on cell #2 for the normal subframe. As another example, ARI values 0 and 1 may be configured to indicate PUCCH resources 0 and 1 on cell #1, respectively, and ARI values 2 and 3 may be configured to indicate PUCCH resources 1 and 2 on cell #2. Herein, a PUCCH format configured on cell #1 may be equal to or different from a PUCCH format configured on cell #2 (Case 1). As another example, the ARI may be configured to indicate PUCCH resources on a plurality of cells for the specific subframe and indicate a PUCCH resource on a single cell for the normal subframe, as in Case 1. Even in this case, a PUCCH format configured for the specific subframe may be equal to or different from a PUCCH format configured for the normal subframe.

Even when the PUCCH transmission cell is changed according to subframe by Methods 1 to 3, an A/N transmission timing corresponding to each cell (e.g., reference configuration for the A/N transmission timing) may always be determined based only on one specific PUCCH transmission cell (e.g., a PCell) (e.g., based on a combination with a specific cell) regardless of a subframe (i.e., a PUCCH transmission cell). In addition, (when the specific cell is assumed to be the PCell), a TPC may be signaled through a DL grant corresponding to the PCell (in FDD) regardless of a subframe (i.e., a PUCCH transmission cell) or corresponding to a first scheduled subframe (in TDD) in the PCell and an ARI may be signaled through a DL grant corresponding to the other cells/subframes. As such, when only the PCell (regardless of a subframe) or one subframe in the PCell is scheduled, only A/N related to corresponding scheduling may be transmitted using an implicit PUCCH format 1a/1b (hereinafter, PF1) resource linked to a DL grant transmission resource (this operation is referred to as fallback) and, for the other cases, A/N for all CA configured cells may be transmitted using a PUCCH (e.g., PF3 or PF4) indicated by the ARI.

Meanwhile, in a normal CA situation including the above proposals, a plurality of PUCCH transmission cells (without limiting to one specific cell (e.g., a PCell) as a fallback cell) or a plurality of (E)PDCCH transmission cells (performing scheduling) may be configured as fallback cells. Therefore, if only one of the plural cells is scheduled, only A/N related to corresponding scheduling may be transmitted using a PF1 resource and, for the other cases, A/N for all CA configured cells may be transmitted using a PUCCH resource indicated by the ARI. Herein, the PF1 resource may be a PF1 resource on a scheduled cell or a PF1 resource on a specific cell (e.g., PCell).

Simultaneous Transmission Method of A/N and p-CSI Through PUCCH

In this method, an operation when a PUCCH resource, a UCI transmission control parameter, and A/N, which are configured for the UE, collide with periodic CSI (p-CSI) is described. Herein, A/N may include an SR.

1) For UE Configured With PF4 for A/N Transmission:
  A. 4 PF4 resources (supporting different maximum payload sizes) and 4 PF3 resources may be configured for A/N transmission.
    i. A PF to be used for A/N may be determined between PF3 and PF4 based on an A/N payload size (e.g., PF3 is used for up to X (e.g., X=22) bits, whereas PF4 is used for more than X bits).
    ii. PF3/4 resource used for A/N transmission is indicated by an ARI.
  B. Up to two PF4 resources supporting different maximum payload sizes may be configured only for periodic CSI transmission.
    i. Resources used for p-CSI transmission may be determined between two PF4 resources based on a CSI payload size (e.g., small PF4 resource #1 is used for up to Y bits corresponding to the maximum payload size of the PF4 resource #1, whereas large PF4 resource #2 is used for more than Y bits).

2) Parameter to enable/disable simultaneous A/N+p-CSI transmission
  A. R10_param: simultaneous A/N+CSI transmission on PF2 (PUCCH format 2/2a/2b) is enabled/disabled.
  B. R11_param: simultaneous A/N+p-CSI transmission on PF3 is enabled/disabled.
  C. R13_param: simultaneous A/N+p-CSI transmission on PF4 is enabled/disabled.

3) Case #1: Collision of (A/N without ARI only+(one or) multiple p-CSIs) in a subframe
  A. Alt 1-1: A PF2 resource is used for A/N+CSI.
    i. This is applied only if R10_param is ON.
    ii. Single CSI with highest priority is selected for transmission.
  B. Alt 1-2: A PF4 resource configured for p-CSI transmission is used for A/N+CSI.
    i. This is applied only if R13_param is ON. Otherwise, Alt 1-1 is applied.
    ii. When two PF4 resources are configured for p-CSI transmission, a resource used for A/N+CSI is determined based on a total UCI payload size. For example, the total UCI payload size includes both A/N bits and CSI bits.
      1. For example, small PF4 resource #1 is used for up to Y bits corresponding to the maximum payload size of the PF4 resource #1, whereas large PF4 resource #2 is used for more than Y bits.

4) Case #2: Collision of (A/N with ARI≤X bits+(one or) multiple p-CSIs) in one subframe
  A. Alt 2-1: A PF3 resource indicated by an ARI is used for A/N+CSI
    i. This is applied only if R11_param is ON.
    ii. If total UCI payload size>X bits, some or all CSI(s) are dropped.
  B. Alt 2-2: A PF4 resource configured for p-CSI transmission is used for A/N+CSI.
    i. This is applied if R13_param is ON. Otherwise, Alt 2-1 is applied.
    ii. When two PF4 resources are configured for p-CSI transmission, the resource used for A/N+CSI is determined based on a total UCI payload size. For example, the total UCI payload may include both A/N bits and CSI bits.
      1. For example, small PF4 resource #1 is used for up to Y bits corresponding to the maximum payload size of PF4 resource #1, whereas large PF4 resource #2 is used for more than Y bits.

In a situation in which A/N and (plural) CSIs are simultaneously transmitted in a specific PUCCH format/resource (or PUSCH) through an arbitrary method including the above proposed schemes, the total number of UCI bits including A/N and CSIs may exceed a maximum UCI payload size (i.e., max_UCI_size) configured for the specific PUCCH format/resource. In this case, a UE may perform the following UCI transmission operations. The specific PUCCH format/resource may include a PUCCH format/resource indicated by an ARI in a DL grant or a PUCCH format/resource configured for CSI transmission.

1) Method 2-1: A/N Bundling First

In this method, (spatial) bundling is applied first to A/N. Next, the bundled A/N and CSI are transmitted through a designated/configured PUCCH format/resource. If the total number of UCI bits including the bundled A/N and the CSI still exceeds max_UCI_size, only specific CSI(s) having a high priority may be selected from among (plural) CSIs and the bundled A/N and the selected CSI(s) may be transmitted through the designated/configured PUCCH format/resource. In this case, the number of selected CSI(s) may be determined such that the total number of bits of the bundled A/N and selected CSI(s) becomes the maximum number of bits less than max_UCI_size. Meanwhile, when the number of UCI bits including the bundled A/N and one CSI having the highest priority exceeds max_UCI_size, all CSIs are dropped and only the bundled A/N may be transmitted through the designated/configured PUCCH format/resource.

2) Method 2-2: CSI Dropping First

In this method, only specific CSI(s) having a high priority are selected from among (plural) CSIs and the selected CSI(s) and A/N are transmitted through a designated/configured PUCCH format/resource. In this case, the number of selected CSI(s) may be determined such that the total number of bits of the A/N and selected CSI(s) becomes the maximum number of bits less than max_UCI_size. If the total number of UCI bits including the A/N and one CSI having the highest priority exceeds max_UCI_size, all CSIs are dropped and only the A/N may be transmitted through the designated/configured PUCCH format/resource. Meanwhile, when the number of A/N bits alone exceeds max_U-CI_size, (spatial) bundling is applied to A/N and only the bundled A/N (without CSI) may be transmitted through the designated/configured PUCCH format/resource.

3) Method 2-3: Modified Method 2-2

In this method, basic operation steps are the same as in Method 2 (e.g., CSI dropping first and A/N bundling second). In a state in which (spatial) bundling is applied to A/N which is the last step, only specific CSI(s) having a high priority may be selected again from among (plural) CSIs and the bundled A/N and selected CSI(s) may be transmitted through a designated/configured PUCCH format/resource. In this case, the number of selected CSI(s) may be determined such that the total number of bits of the bundled A/N and selected CSI(s) becomes the maximum number of bits less than max_UCI_size. Meanwhile, when the number of UCI bits including the bundled A/N and one CSI having the highest priority exceeds max_UCI_size, all CSIs are dropped and only the bundled A/N may be transmitted through the designated/configured PUCCH format/resource.

Figure 17:
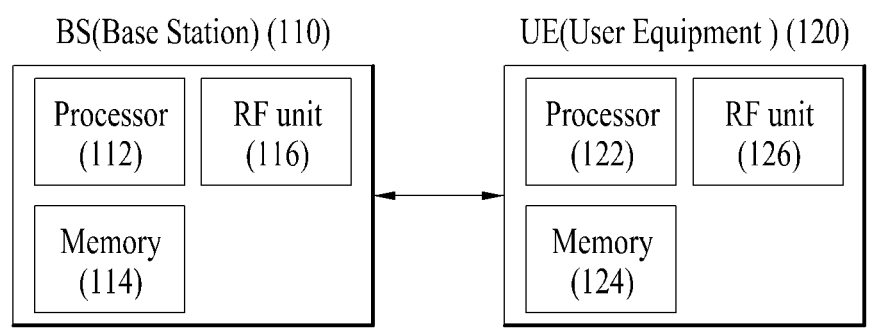
FIG. 17 illustrates a BS and a UE to which embodiments of the present invention are applicable.

FIG. 17 illustrates a BS and a UE to which embodiments of the present invention are applicable. When a wireless communication system includes a relay, the BS or the UE can be replaced by the relay.

Referring to FIG. 17, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for wireless communication apparatuses such as a UE, a relay, a BS, etc.

The invention claimed is:

1. A method for a user equipment (UE) to transmit control information in a wireless communication system, the method comprising:
generating an Uplink Control Information (UCI) payload including Hybrid ARQ Acknowledgement (HARQ-ACK) information and channel state information (CSI);
based on a size of the UCI payload being larger than a maximum payload size of a Physical Uplink Control Channel (PUCCH) format, reducing a size of the CSI so that a size of a reduced UCI payload is within the maximum payload size;
generating a UCI codeword from the reduced UCI payload; and
transmitting the UCI codeword through UCI symbol(s) of the PUCCH format,
wherein a number of the UCI symbol(s) of the PUCCH format is one of a plurality of values, and
wherein the maximum payload size of the PUCCH format is determined based on the number of the UCI symbol(s) of the PUCCH format.

2. The method of claim 1, wherein the size of the UCI codeword is matched to a total resource amount of the UCI symbol(s) of the PUCCH format.

3. The method of claim 1, wherein the maximum payload size of the PUCCH format for M UCI symbol(s) is less than the maximum payload size of the PUCCH format for N SC-FDMA symbol(s), and wherein M is less than N.

4. The method of claim 1, wherein different information is transmitted in each of the UCI symbol of the PUCCH format.

5. The method of claim 1, wherein the wireless communication system includes a 3rd Generation Partnership Project (3GPP)-based wireless communication system,
wherein the number of UCI symbol(s) of the PUCCH format is N when Sounding Reference Signal (SRS) protection is not required,
wherein N>1, and
wherein the number of UCI symbol(s) of the PUCCH format is N−1 when SRS protection is required.

6. The method of claim 1, wherein the number of UCI symbol(s) of the PUCCH format is N when a Sounding Reference Signal (SRS) transmission of the UE is not present,
wherein N>1, and
wherein the number of UCI symbol(s) of the PUCCH format is N−1 when the SRS transmission of the UE is present.

7. The method of claim 1, wherein the wireless communication system includes a 3rd Generation Partnership Project (3GPP)-based wireless communication system,
wherein N is 12 when a normal CP is configured, and
wherein N is 10 when an extended CP is configured.

8. The method of claim 1, wherein the UCI symbol(s) includes Orthogonal Frequency Division Multiple Access (OFDMA)-based symbols.

9. The method of claim 1, wherein the UCI codeword includes a plurality of sub-blocks, and
wherein each sub-block is mapped on a respective UCI symbol of the PUCCH format after a discrete fourier transformation.

10. The method of claim 1, wherein based on the size of the UCI payload being equal to or smaller than the maximum payload size of the PUCCH format, maintaining the size of the UCI payload.

11. A user equipment (UE) for use in a wireless communication, the UE comprising:
a transmitter and receiver; and
a processor, operatively coupled to the transmitter and receiver, wherein the processor is configured to:
generate an Uplink Control Information (UCI) payload including Hybrid ARQ Acknowledgement (HARQ-ACK) information and channel state information (CSI),
based on a size of the UCI payload being larger than a maximum payload size of a Physical Uplink Control Channel (PUCCH) format, reduce a size of the CSI so that a size of a reduced UCI payload is within the maximum payload size,
generate a UCI codeword from the reduced UCI payload, and
control the transmitter to transmit the UCI codeword through UCI symbol(s) of the PUCCH format,
wherein a number of the UCI symbol(s) of the PUCCH format is one of a plurality of values, and
wherein the maximum payload size of the PUCCH format is determined based on the number of the UCI symbol(s) of the PUCCH format.

12. The UE of claim 11, wherein the size of the UCI codeword is matched to a total resource amount of the UCI symbol(s) of the PUCCH format.

13. The UE of claim 11, wherein the maximum payload size of the PUCCH format for M UCI symbol(s) is less than the maximum payload size of the PUCCH format for N SC-FDMA symbol(s), and wherein M is less than N.

14. The UE of claim 11, wherein different information is transmitted in each of the UCI symbol of the PUCCH format.

15. The UE of claim 11, wherein the wireless communication system includes a 3rd Generation Partnership Project (3GPP)-based wireless communication system,
wherein the number of UCI symbol(s) of the PUCCH format is N when Sounding Reference Signal (SRS) protection is not required,
wherein N>1, and
wherein the number of UCI symbol(s) of the PUCCH format is N−1 when SRS protection is required.

16. The UE of claim 11, wherein the number of UCI symbol(s) of the PUCCH format is N when a Sounding Reference Signal (SRS) transmission of the UE is not present,
wherein N>1, and
wherein the number of UCI symbol(s) of the PUCCH format is N−1 when the SRS transmission of the UE is present.

17. The UE of claim 11, wherein the wireless communication system includes a 3rd Generation Partnership Project (3GPP)-based wireless communication system,
wherein N is 12 when a normal CP is configured, and
wherein N is 10 when an extended CP is configured.

18. The UE of claim 11, wherein the UCI symbol(s) includes Orthogonal Frequency Division Multiple Access (OFDMA)-based symbols.

19. The UE of claim 11, wherein the UCI codeword includes a plurality of sub-blocks, and
wherein each sub-block is mapped on a respective UCI symbol of the PUCCH format after a discrete fourier transformation.

20. The UE of claim 11, wherein based on the size of the UCI payload being equal to or smaller than the maximum payload size of the PUCCH format, maintaining the size of the UCI payload.

* * * * *